(12) United States Patent
Nordman

(10) Patent No.: US 12,358,605 B2
(45) Date of Patent: Jul. 15, 2025

(54) VEHICLE WINDOW ASSEMBLY

(71) Applicant: THE BOEING COMPANY, Chicago, IL (US)

(72) Inventor: Paul S. Nordman, Seattle, WA (US)

(73) Assignee: The Boeing Company, Chicago, IL (US)

( * ) Notice: Subject to any disclaimer, the term of this patent is extended or adjusted under 35 U.S.C. 154(b) by 149 days.

(21) Appl. No.: 17/654,097

(22) Filed: Mar. 9, 2022

(65) Prior Publication Data

US 2023/0286637 A1    Sep. 14, 2023

(51) Int. Cl.
*B64C 1/14* (2006.01)

(52) U.S. Cl.
CPC .................... *B64C 1/1492* (2013.01)

(58) Field of Classification Search
CPC ... B64C 1/1492; B64C 1/1476; B64C 1/1484; B60J 1/001; B60J 1/008
See application file for complete search history.

(56) References Cited

U.S. PATENT DOCUMENTS

| | | | | |
|---|---|---|---|---|
| 2,145,930 A | * | 2/1939 | Herron | B60J 10/70 156/107 |
| 2,369,382 A | * | 2/1945 | Watkins | B64C 1/1492 52/204.593 |
| 2,375,369 A | * | 5/1945 | Knight | B64C 1/1484 219/203 |
| 2,388,786 A | * | 11/1945 | Knight | B64C 1/1492 52/764 |
| 3,009,845 A | * | 11/1961 | Wiser | B32B 17/10036 52/203 |
| 3,382,630 A | * | 5/1968 | Chivers | E06B 3/5436 411/537 |
| 3,679,527 A | * | 7/1972 | Crick | B64C 1/1492 428/101 |
| 3,836,193 A | * | 9/1974 | Donahoe | B60J 1/2094 296/84.1 |
| 3,930,452 A | * | 1/1976 | Van Laethem | B32B 17/10174 428/339 |
| 4,081,581 A | * | 3/1978 | Littell, Jr. | C09J 175/06 428/137 |
| 4,121,014 A | * | 10/1978 | Shaffer | B32B 17/10036 428/424.2 |
| 4,204,374 A | * | 5/1980 | Olson | B64C 1/1492 52/204.591 |
| 4,278,875 A | * | 7/1981 | Bain | B32B 17/10036 219/547 |
| 4,324,373 A | * | 4/1982 | Zibritosky | B64C 1/1492 52/204.591 |

(Continued)

FOREIGN PATENT DOCUMENTS

WO      WO-0020275 A2  *  4/2000  .......... B64C 1/1492

*Primary Examiner* — Christopher D Hutchens
(74) *Attorney, Agent, or Firm* — The Small Patent Law Group LLC; Philip S. Hof

(57) ABSTRACT

A vehicle window assembly includes at least one body panel and a window pane. The at least one body panel defines a window opening along an exterior surface of a vehicle body. The vehicle body defines an internal cabin. The window pane is secured to the at least one body panel and positioned to cover the window opening. The window pane is a laminate stack of multiple tempered glass sheets bonded together.

15 Claims, 6 Drawing Sheets

(56) References Cited

U.S. PATENT DOCUMENTS

| | | | | |
|---|---|---|---|---|
| 4,699,335 | A * | 10/1987 | DeOms | B64C 1/1484 403/372 |
| 4,979,342 | A * | 12/1990 | Holdridge | B64C 1/1492 52/208 |
| 5,277,384 | A * | 1/1994 | Webb | B64C 1/1492 277/921 |
| 5,796,055 | A * | 8/1998 | Benson, Jr. | B32B 17/10761 181/290 |
| 5,840,429 | A * | 11/1998 | Rukavina | C08J 7/0423 428/629 |
| 5,885,714 | A * | 3/1999 | Demeester | B32B 27/306 428/416 |
| 6,067,761 | A * | 5/2000 | Demeester | B64C 1/1492 428/192 |
| 6,467,225 | B1 * | 10/2002 | Shimomura | B60J 1/17 52/204.5 |
| 6,619,590 | B2 * | 9/2003 | Wojatschek | B64C 1/1492 296/84.1 |
| 7,080,807 | B2 * | 7/2006 | Olson | B32B 17/10174 52/208 |
| 7,578,474 | B2 | 8/2009 | Balsillie et al. | |
| 8,439,154 | B1 * | 5/2013 | Lewis | B64C 1/1492 52/204.593 |
| 2003/0010867 | A1 * | 1/2003 | Wojatschek | B64C 1/1492 244/129.2 |
| 2004/0159743 | A1 * | 8/2004 | Wood | B64C 1/1476 244/121 |
| 2005/0082432 | A1 * | 4/2005 | Nordman | B29C 70/086 244/129.3 |
| 2006/0228558 | A1 * | 10/2006 | Berry | B32B 27/286 428/412 |
| 2008/0197237 | A1 * | 8/2008 | Bold | B64C 1/1492 244/129.3 |
| 2009/0217813 | A1 * | 9/2009 | Carberry | B32B 17/10761 89/36.02 |
| 2011/0070451 | A1 * | 3/2011 | Khanna | B32B 17/10045 428/428 |
| 2013/0025219 | A1 * | 1/2013 | Edmond | F16B 5/0241 52/204.7 |
| 2014/0314973 | A1 * | 10/2014 | Desroches | B64C 1/1484 428/34 |
| 2015/0047275 | A1 * | 2/2015 | McCarthy | B64C 1/14 52/204.51 |
| 2015/0337885 | A1 * | 11/2015 | Whitlock | F16B 35/048 29/458 |
| 2016/0090168 | A1 * | 3/2016 | Grady | B64G 1/60 29/402.02 |
| 2017/0334540 | A1 * | 11/2017 | Hanske | B64C 1/1484 |
| 2018/0201358 | A1 * | 7/2018 | Wall | B64C 1/1492 |
| 2019/0383319 | A1 * | 12/2019 | Simpson | C23C 30/00 |
| 2020/0114624 | A1 * | 4/2020 | Mannheim Astete | B32B 17/10036 |
| 2020/0180748 | A1 * | 6/2020 | Reichensperger | B60J 1/006 |
| 2020/0223191 | A1 * | 7/2020 | Ladewski | G09F 19/18 |
| 2020/0223528 | A1 * | 7/2020 | Debrus | B64D 45/02 |
| 2020/0385099 | A1 * | 12/2020 | Chaveron | B64C 1/1492 |
| 2021/0147058 | A1 * | 5/2021 | Ashmawi | B64C 1/1492 |
| 2021/0187913 | A1 * | 6/2021 | Tondu | B32B 17/10293 |
| 2021/0291956 | A1 * | 9/2021 | Owings | C03C 17/366 |
| 2023/0104093 | A1 * | 4/2023 | Bergeler | F21V 14/003 362/471 |

* cited by examiner

VEHICLE WINDOW ASSEMBLY

FIELD OF THE DISCLOSURE

Embodiments of the present disclosure generally relate to windows on vehicles, such as passenger windows on aircraft.

BACKGROUND OF THE DISCLOSURE

Vehicles, including commercial aircraft, typically include passenger windows installed in openings along a body of the vehicle. Conventional passenger windows in vehicles are composed of transparent polymer materials, such as stretched acrylic. The acrylic material is brittle and sensitive to pressure and temperature, so typical window assemblies utilize two panes. The panes are secured to the fuselage via a frame assembly. The frame assembly may serve to absorb and transfer forces along the fuselage, such as hoop tension along a circumferential perimeter of the fuselage. The multiple panes and the frame assembly can add significant weight to the vehicle, which is undesirable for efficient vehicle travel. In an aircraft application, minimizing weight can directly increase fuel efficiency. The fabrication and installation of the frame assembly also add complexity and cost to vehicle production. The acrylic material of the window is susceptible to surface crazing at certain levels of mechanical stress and/or strain. One or both of the panes may be formed substantially thick to reduce the risk of crazing, but the increased thickness makes the pane(s) heavier. The acrylic material is furthermore susceptible to foreign object damage. The acrylic material is relatively flexible, and during flight the windows bulge outward beyond an exterior surface of the fuselage into the airstream, due to a pressure differential between the fuselage and the ambient environment. The bulging of the windows into the airstream may create additional drag on the aircraft, which reduces movement efficiency.

SUMMARY OF THE DISCLOSURE

A need exists for a vehicle window assembly that is lighter, less complex, less costly, and/or less susceptible to foreign object damage than known window assemblies. A need exists for a vehicle window assembly that is more aerodynamic than known window assemblies, to reduce drag during vehicle travel.

With those needs in mind, certain embodiments of the present disclosure provide a vehicle window assembly that includes at least one body panel and a window pane. The at least one body panel defines a window opening along an exterior surface of a vehicle body. The vehicle body defines an internal cabin. The window pane is secured to the at least one body panel and positioned to cover the window opening. The window pane is a laminate stack of multiple tempered glass sheets bonded together.

Certain embodiments provide a method for assembling a vehicle window. The method includes securing a window pane to at least one body panel of a vehicle body. The window pane is positioned to cover a window opening along an exterior surface of the vehicle body. The window pane is a laminate stack of multiple tempered glass sheets bonded together.

Certain embodiments provide an aircraft that includes a fuselage, a window pane, and a fairing pane. The fuselage defines an internal cabin. The fuselage includes at least one panel that defines a window opening along an exterior surface of the fuselage. The window pane is secured to the at least one body panel and positioned to cover the window opening. The window pane is a laminate stack of multiple tempered glass sheets bonded together. The fairing pane is secured to at least one of the window pane or the at least one body panel. The fairing pane is positioned outboard of the window pane and extends across the window opening. A medial portion of the fairing pane is separated from the window pane by a gap that contains a gas. The medial portion is configured to bulge outward away from the window pane, increasing a size of the gap, based on a pressure differential experienced by the fairing pane when the aircraft is traveling at a cruising speed and a cruising altitude.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Certain embodiments of the present disclosure provide a window assembly for use on a vehicle. The window assembly according to the embodiments disclosed herein is a composite that includes multiple glass sheets bonded together to form a laminated stack. The glass sheets may be bonded together via an adhesive disposed between each pair of adjacent glass sheets. The glass sheets are tempered glass for increased strength and impact resistance. The laminated glass window pane described herein may have sufficient strength to provide structural support for the vehicle body (e.g., fuselage). For example, the window pane may carry an internal pressure load, a hoop tension load along the vehicle body, and a shear load along the vehicle body. The laminated glass window pane may not be subject to crazing under load. The window assembly may secure the window pane to the vehicle body in a way that avoids the need for a discrete frame assembly, which beneficially reduces weight, parts, and installation complexity. These and other technical effects of the window assembly are described in more detail herein with reference to the figures.

Figure 1:
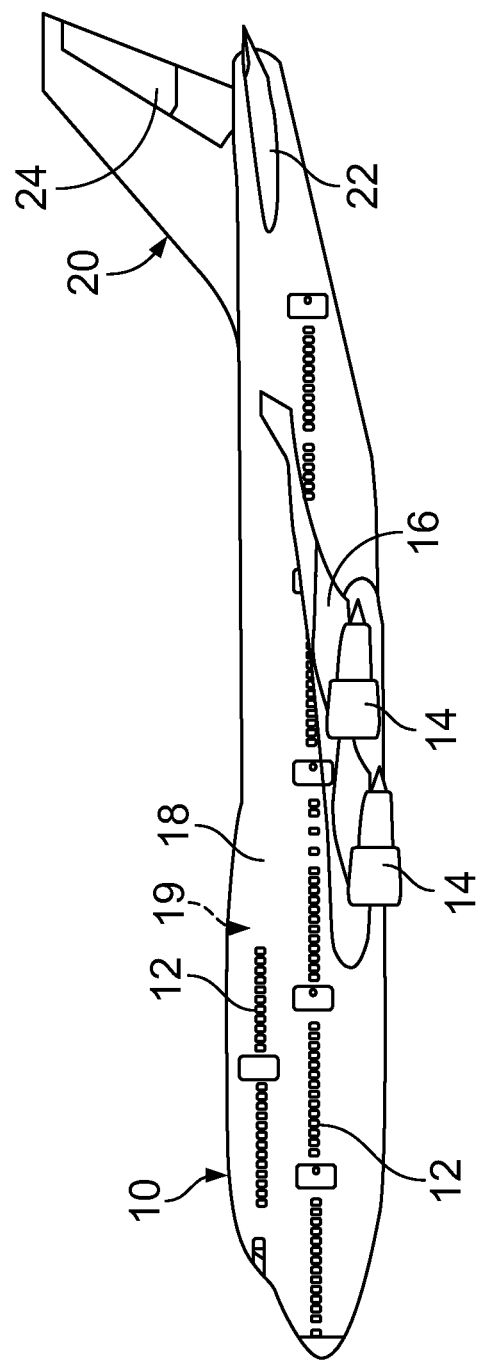
FIG. 1 is a side view of an aircraft that includes a plurality of vehicle window assemblies.

FIG. 1 is a side view of an aircraft 10 that includes a plurality of vehicle window assemblies 12. The aircraft 10 includes a propulsion system that includes engines 14, for example. The engines 14 may be carried by wings 16 of the aircraft 10. In other embodiments, the engines 14 may be carried by a vehicle body 18 and/or an empennage 20 of the aircraft 10. The empennage 20 may include horizontal stabilizers 22 and a vertical stabilizer 24. The vehicle window assemblies 12 (referred to herein as window assemblies) are mounted to the vehicle body 18. The vehicle body 18 of the aircraft 10 is referred to herein as a fuselage 18.

The fuselage 18 of the aircraft 10 defines an internal cabin 19, which is an internal volume or space. The internal cabin 19 includes one or more passenger sections (for example, first class, business class, and coach sections), and at least some of the window assemblies 12 are disposed along the passenger section(s) to enable passengers to view outside of the aircraft 10. The internal cabin 19 may also include a flight deck or cockpit, one or more work sections (for example, galleys, personnel carry-on baggage areas, and the like), one or more cargo areas (e.g., bays), one or more lavatories, and/or the like.

Installing the window assemblies 12, according to the embodiments described herein, on the aircraft 10 can reduce the weight of the aircraft 10 because the window assemblies 12 are lighter than conventional window assemblies. The weight savings is particularly useful in aerial vehicles, but the window assembly 12 may also increase the travel efficiency of other, non-aerial vehicles, such as rail vehicles, trucks, buses, automobiles, off-road trucking equipment, watercraft, and the like. Optionally, the window assembly disclosed herein may even be used in non-vehicular applications, such as within office buildings, retail businesses, residential buildings, manufacturing facilities, and/or the like.

Figure 2:
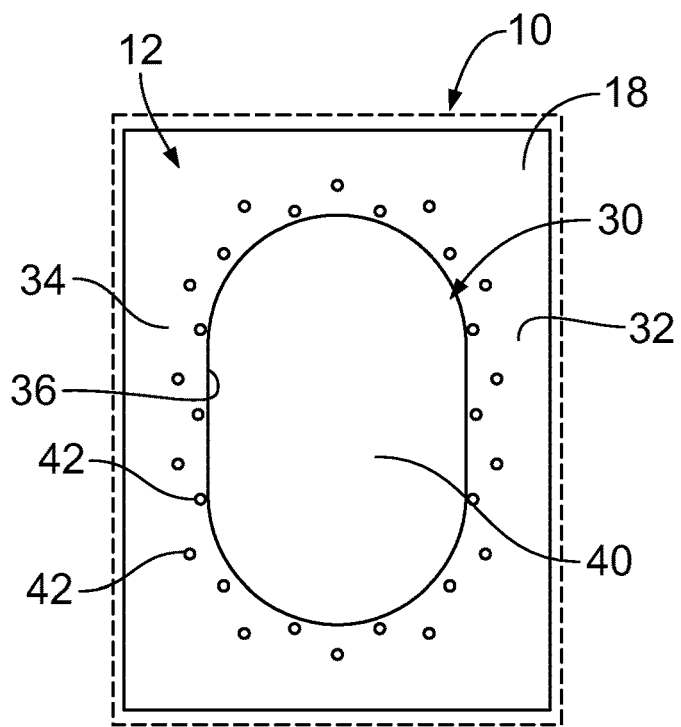
FIG. 2 is an enlarged view of one of the window assemblies of the aircraft according to an embodiment of the present disclosure.

FIG. 2 is an enlarged view of one of the window assemblies 12 of the aircraft 10 according to an embodiment. The window assembly 12 is secured to the fuselage 18 within a window opening 30 that is defined along an exterior surface 32 of the fuselage 18. The fuselage 18 includes at least one body panel 34 that defines a perimeter edge 36 of the window opening 30. In FIG. 2, a single body panel 34 surrounds the window opening 30 and defines the entire perimeter edge 36. Alternatively, two or more body panels 34 may define different corresponding portions of the perimeter edge 36, and the panels 34 may connect at seams. In the illustrated embodiment, the body panel 34 is a skin that forms an outermost layer of the fuselage 18. Alternatively, the body panel 34 may form a layer that is not the outermost layer. For example, the body panel 34 may be covered by a discrete skin layer. In an embodiment, the window assembly 12 includes at least the body panel(s) 34 and a window pane 40.

The window pane 40 is secured to the body panel 34 and is positioned to cover the window opening 30. For example, the window pane 40 extends across and covers the area of the window opening 30. The window pane 40 may be sealed to the fuselage 18 to hermetically seal the internal cabin 19 from the external environment. For example, the window pane 40 may be sealed to the body panel 34 to prohibit the formation of leak paths between the window pane 40 and the body panel 34. The window pane 40 is transparent (or at least translucent) to enable a person inside the internal cabin 19 to view the external environment.

The window assembly 12 optionally includes a plurality of fasteners 42 that are circumferentially spaced around the window opening 30. The fasteners 42 may extend through holes or apertures in the window pane 40 and into corresponding holes or apertures in the body panel 34 of the fuselage 18. An alternative embodiment of the window assembly 12 does not utilize fasteners. In the alternative embodiment, the window pane 40 is bonded to the body panel 34 along an overlapping area between the window pane 40 and the body panel 34.

Figure 3:
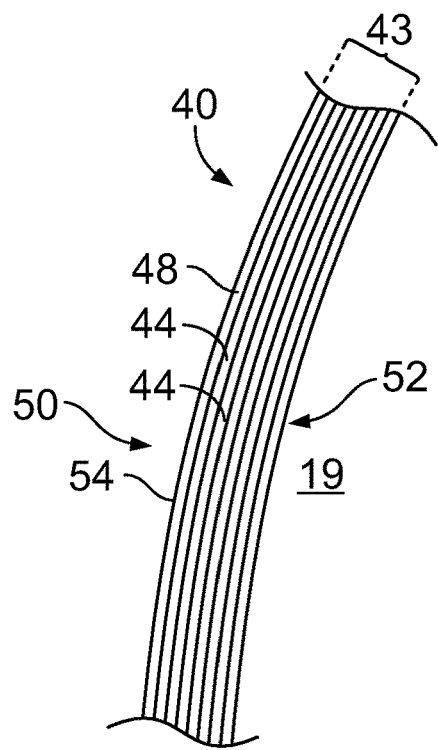
FIG. 3 is a cross-sectional view of a portion of a window pane of the window assembly according to an embodiment of the present disclosure.

FIG. 3 is a cross-sectional view of a portion of the window pane 40 according to an embodiment. The window pane 40 is a laminate stack 43 of multiple glass sheets 44 bonded together. The glass sheets 44 may be bonded together via an adhesive. The adhesive may be a thermoset, such as an epoxy, a thermoplastic, or the like. The laminate stack 43 may be cured in an oven to form a monolithic, one-piece window pane 40. The glass sheets 44 in an embodiment are subjected to a tempering process to enhance strength, resulting in tempered glass sheets 44. The glass sheets 44 may be thin. For example, each glass sheet 44 may have a thickness that is no greater than 0.05 inches (0.127 cm). In an embodiment, the thickness of the glass sheets 44 is less than 0.02 inches (0.05 cm). The window pane 40 itself may be relatively thin as well. For example, the window pane 40 may have a thickness 46 that is no greater than 0.75 inches (1.905 cm). Optionally, the thickness 46 may be no greater than 0.5 inches (1.27 cm). The glass sheets 44 and adhesive are sufficiently thin that the laminate stack 43 can include a plurality of glass sheets 44 while achieving the thin overall window pane 40. For example, the laminate stack 43 may include at least five glass sheets 44, or optionally at least ten glass sheets 44. Increasing the number of individual tempered glass sheets 44 in the laminate stack 43 may increase the strength of the window pane 40. In one example embodiment, the window pane 40 includes 11 glass sheets 44 that are 0.013 inches thick, with 0.005 inch thick adhesive layers therebetween to define a window pane 40 that is 0.193 inches thick. In an embodiment, the glass sheets 44 may represent at least 70% of the mass of the laminate stack 43. The slimness and the glass content of the window pane 40 result in the window pane 40 being light-weight, yet structurally strong. The window pane 40 may be curved to match a contour of the fuselage 18.

In an embodiment, the window pane 40 includes a transparent ceramic sheet 48 at one or both ends of the laminate stack 43. The transparent ceramic sheet 48 is disposed at an outboard end 50 of the stack 43 in FIG. 3. The outboard end 50 defines an outer surface 54 of the window pane 40 that faces towards the external environment (e.g., away from the internal cabin 19). The ceramic sheet 48 may be bonded to the glass sheet 44 next to the ceramic sheet 48. The ceramic sheet 48 may bond to the glass sheet 44 via the same type of adhesive that is between the glass sheets 44. The ceramic sheet 48 may provide properties such as scratch resistance, compression strength, and/or toughness. The ceramic sheet 48 is composed of a ceramic material. The ceramic material may be a cubic aluminum oxynitride, a cubic aluminum oxide, or the like. Optionally, another ceramic sheet or a different protective layer may be applied to the opposite, inboard end 52 of the stack 43.

In an alternative embodiment, the laminate stack 43 may include individual sheets of a transparent or translucent material that is other than tempered glass. For example, the laminate stack 43 may include a fiber-reinforced polymer, such as fiberglass, or a polymer material that does not include fibers.

Figure 4:
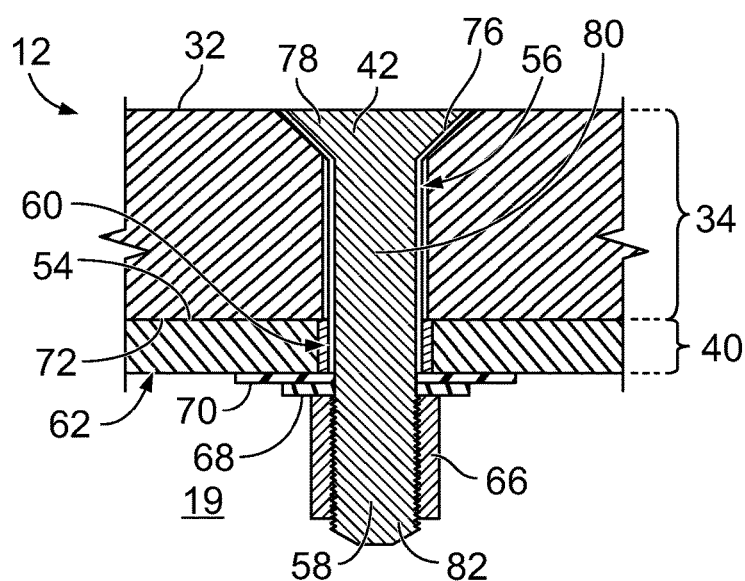
FIG. 4 is a cross-sectional view of a portion of the window assembly shown in FIG. 2, with the sectional line extending through a fastener.

FIG. 4 is a cross-sectional view of a portion of the window assembly 12 shown in FIG. 2, with the sectional line extending through one of the fasteners 42. In an embodiment, the window pane 40 is secured to the body panel 34 without the use of a separate frame assembly between the two components. Avoiding the separate frame assembly serves to reduce weight, as well as reduce part cost and assembling complexity. In the illustrated embodiment, the window pane 40 has a perimeter portion 62 that is positioned outside of the window opening 30. The perimeter portion 62 overlaps a portion of the body panel 34 and is secured to the body panel 34 via a lap joint. The portion of the window pane 40 shown in FIG. 4 is the perimeter portion 62, which overlaps the body panel 34. In an embodiment, the window pane 40 is disposed inboard of the body panel 34. For example, the outer surface 54 of the window pane 40, along the perimeter portion 62, faces towards an inner surface 72 of the body panel 34. The inner surface 72 of the body panel 34 faces towards the internal cabin 19. The outer surface 54 may directly abut the inner surface 72, or a sealant, a gasket, or the like may be disposed at between the two surfaces 54, 72 to seal the interface.

In the illustrated embodiment, the lap joint is provided by the mechanical retention of the fastener 42. The fastener 42 is inserted through a hole 56 in the body panel 34. The fastener 42 projects beyond the body panel 34 and into a corresponding aperture 60 in the window pane 40. The hole 56 and the aperture 60 optionally may be pre-formed prior to inserting the fastener 42. The window pane 40 may be positioned relative to the body panel 34 to align the aperture 60 with the hole 56 before inserting the fastener 42. The fastener 42 may be longer than the combined thickness of the body panel 34 and the window pane 40, such that a distal segment 58 of the fastener 42 projects beyond the window pane 40. The distal segment 58 may be threaded to couple to a complementary retainer element 66. Optionally, a spacer 68 and/or washer 70 may be interposed between the window pane 40 and the retainer element 66. The fastener 42 may be any type of mechanical element that can reliably affix the window pane 40 to the body panel 34. Suitable fasteners 42 may include bolts, rivets, or the like.

In an embodiment, the fastener 42 may include a protective coating 76. The protective coating 76 may be a metal material. In an embodiment the protective coating 76 is a liquid metal material. The liquid metal material may have a low melting point. The coating 76 may protect the window pane 40 from damage at contact interfaces with the fastener 42. For example, the coating 76 may distribute pressure across the thickness of the of the laminate stack 43, rather than apply a point load on one of the glass sheets 44, which could damage the sheet 44. The coating 76 may be located along surfaces of the fastener 42 that may contact the window pane 40. In the illustrated embodiment, the coating 76 is present on the underside of the head 78 of the fastener 42 and along a proximal segment 80 of a shaft 82 of the fastener 42. The proximal segment 80 has a smooth bearing surface. The coating 76 is not present on the threads of the distal segment 58. Alternatively, the coating 76 may only be located on the proximal segment 80, or the entirety of the fastener 42 may be covered by the coating 76.

In an alternative embodiment, the lap joint is provided by bonding the perimeter portion 62 of the window pane 40 to the body panel 34. For example, an adhesive may be applied at the interface between the outer surface 54 of the window pane 40 and the inner surface 72 of the body panel 34. In another embodiment, both fasteners 42 and bonding may be used to secure the window pane 40 to the body panel 34.

Figure 5:
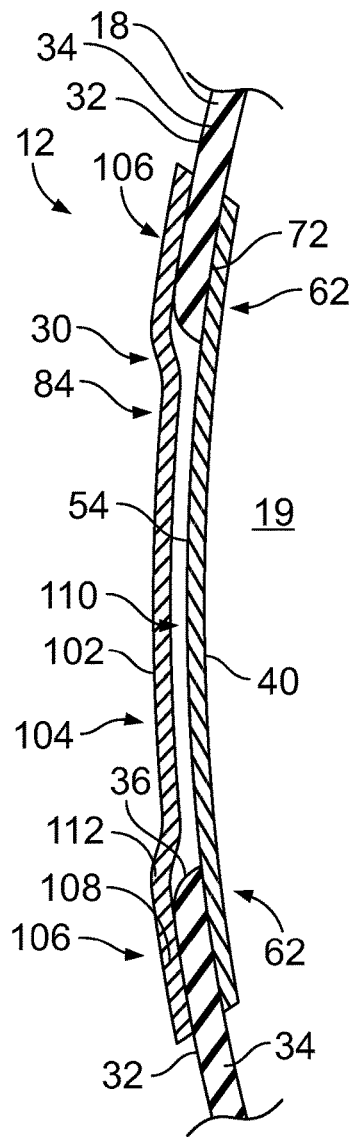
FIG. 5 is a cross-sectional view of the window assembly according to an embodiment of the present disclosure.

FIG. 5 is a cross-sectional view of the window assembly 12 according to an embodiment. The perimeter portion 62 of the window pane 40 is secured to the body panel 34 outside of the window opening 30. The perimeter portion 62 may overlap portions of the body panel 34 that surround the window opening 30. The window pane 40 may function as a structural component. For example, the window pane 40 may structurally support the fuselage 18 by absorbing shear force, hoop tension, and the like, in addition to withstanding a pressure differential between the internal cabin 19 and the external environment. The laminated window pane 40 may be sufficiently strong and rigid to avoid significant deflection and bulging due to the pressure differential while the aircraft 10 (shown in FIG. 1) is in flight.

In the illustrated embodiment, the window pane 40 is affixed to the body panel 34 along the inner surface 72 of the body panel 34. This results in a depression 84 that is formed along the exterior of the fuselage 18 at the location of the window opening 30. The depression 84 is circumferentially defined by the perimeter edge 36 of the body panel 34, and has a depth that extends from the exterior surface 32 of the fuselage 18 (e.g., the outer surface of the body panel 34) to the outer surface 54 of the window pane 40. For example, in the illustrated embodiment in which the window pane 40 abuts the inner surface 72 of the body panel 34 and the body panel 34 represents the exterior skin of the aircraft 10, the depth of the depression 84 corresponds to the thickness of the body panel 34. During flight, the depression 84, if unfilled, may contribute to drag, which would reduce the travel efficiency of the aircraft 10.

To reduce drag along the fuselage 18, the window assembly 12 according to an embodiment includes a fairing pane 102. The fairing pane 102 is positioned outboard of the window pane 40. The fairing pane 102 extends across the window opening 30 and across the depression 84. For example, the fairing pane 102 may cover the entire surface area of the window opening 30, similar to the window pane 40. A portion of the fairing pane 102 may slope or step down into the depression 84 towards the window pane 40. The material of the fairing pane 102 is transparent, or at least translucent, to enable viewing of the external environment therethrough. The fairing pane 102 may have a different construction than the window pane 30. The fairing pane 102 is not merely a second window pane of a dual-pane window. For example, the fairing pane 102 may be constructed of a polymer material, such as a thermoplastic. The fairing pane 102 is designed to bulge outward away from the window pane 40 based on a pressure differential experienced while traveling, to at least partially fill the depression 84. For example, the fairing pane 102 bulges outward such that a center or apex of the bulging fairing pane 102 is approximately flush with the exterior surface 32 of the fuselage 18, or at least closer to flush with the exterior surface 32 than when the fairing pane 102 is not bulging outward. The fairing pane 102 in the deflected (or bulged) state occupies more space within the depression 84 than the fairing pane 102 does in a non-deflected, pressure-balanced state, which reduces the drag along the exterior of the fuselage 18.

Figure 6:
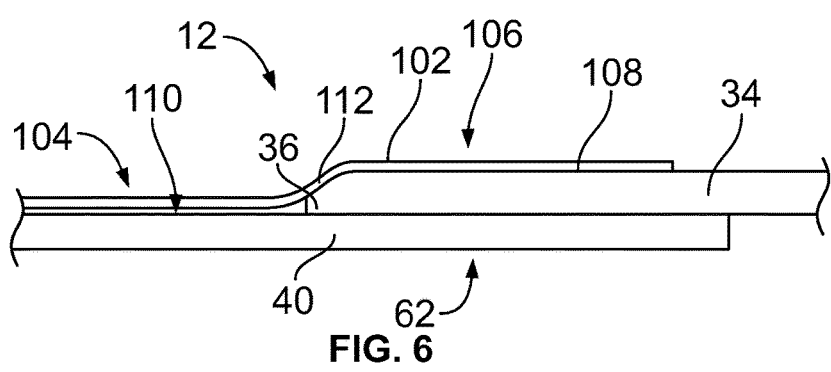
FIG. 6 is an enlarged view of an end portion of the window assembly shown in FIG. 5.

FIG. 6 is an enlarged view of an end portion of the window assembly 12 shown in FIG. 5. Referring to both FIGS. 5 and 6, the fairing pane 102 includes a medial portion 104 and a perimeter portion 106. The perimeter portion 106 surrounds the medial portion 104. The medial portion 104 is positioned within the window opening 30 and the depression 84. The perimeter portion 104 is outside of the window opening 30 and secures the fairing pane 102 in place. In the illustrated embodiment, the perimeter portion 104 of the fairing pane 102 is outboard of the body panel 34. The body panel 34 is disposed (e.g., stacked) between the perimeter portion 106 of the fairing pane 102 and the perimeter portion 62 of the window pane 40. The perimeter portion 104 may be secured to an outer surface 108 of the body panel 34 by bonding with an adhesive, via insertion of the fasteners 42, and/or the like. For example, the fastener 42 shown in FIG. 4 may also extend through a hole in the fairing pane 102 to couple the fairing pane 102, the body panel 34, and the window pane 40 together.

The medial portion 104 of the fairing pane 102 is separated from the window pane 40 by a gap 110. The gap 110 may be sealed to trap a gas, such as air, therein. When there is limited, if any, pressure differential across the fairing pane 102, which occurs while the aircraft 10 is on the ground, the medial portion 104 may be relatively close to the window pane 40. The initial width of the gap 110, from the window pane 40 to the medial portion 104 of the fairing pane 102, at this condition may be relatively small. For example, the initial gap width may be less than 0.2 inches, and optionally may be less than 0.1 inches, such as less than 0.05 inches. The initial gap width may be selected based on the material properties of the fairing pane 102 (e.g., stiffness), the thickness and other dimensions of the fairing pane 102, the expected pressure differential experienced during travel, and the depth of the depression 84. For example, depending on the stiffness and thickness of the fairing pane 102, the initial gap width may be selected such that the medial portion 104 bulges outward, when exposed to a designated pressure differential, a distance that approximately matches the depth of the depression 84.

In an embodiment, the fairing pane 102 may include a sloped transition segment 112 disposed between the medial portion 104 and the perimeter portion 106. The sloped transition segment 112 may generally align with and follow the curve of the perimeter edge 36 defining the window opening 30. The sloped transition segment 112 causes the medial portion 104 to be located on a different plane than the perimeter portion 106. For example, the medial portion 104 is disposed closer to the window pane 40 than the proximity of the perimeter portion 106 to the window pane 40. The sloped transition segment 112 may have a smooth S-curve, a linear ramp, or the like.

In an alternative embodiment, the fairing pane 102 may be secured to the window pane 40. For example, the perimeter portion 106 fairing pane 102 may be disposed inboard of the body panel 34, between the body panel 34 and the window pane 40. In this alternative embodiment, the perimeter portion 106 may abut against the window pane 40, and the sloped transition segment 112 may step the medial portion 104 outward away from the window pane 40 to define the gap 110.

Figure 7:
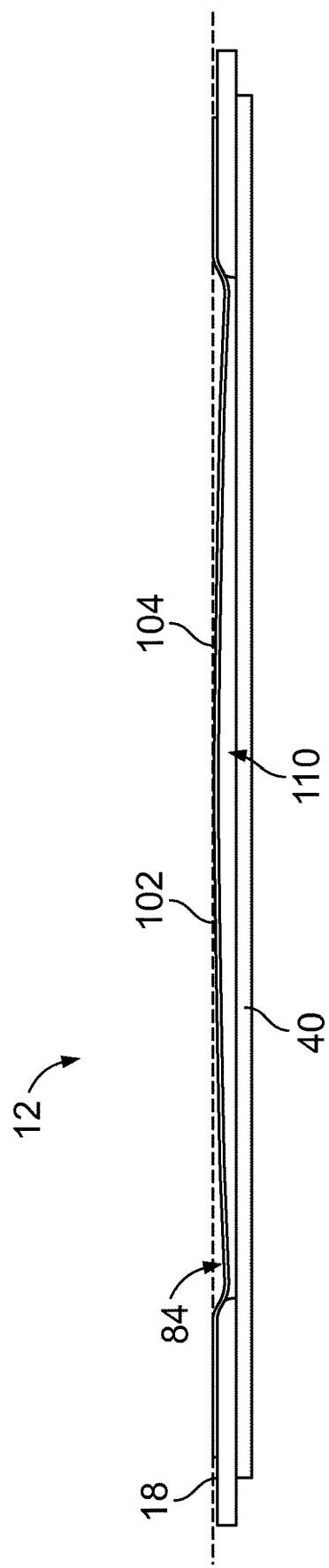
FIG. 7 illustrates the window assembly shown in FIGS. 5 and 6 with the fairing pane in a deflected state.

FIG. 7 illustrates the window assembly 12 shown in FIGS. 5 and 6 with the fairing pane 102 in the deflected state. In an embodiment, the fairing pane 102 is sufficiently thin and flexible such that the medial portion 104 bulges from a resting position based on the pressure differential experienced by the fairing pane 102 while the aircraft 10 (shown in FIG. 1) travels. For example, when the aircraft 10 flies as a cruising speed and a cruising altitude, the air pressure outside of the fuselage 18 may be significantly less than the air pressure within the fuselage 18 (e.g., within the internal cabin 19 of the fuselage 18). This pressure differential across the fairing pane 102 may cause the medial portion 104 to deflect outward away from the window pane 40. The deflection of the fairing pane 102 increases the size of the gap 110. In an example, the volume of the gap 110 may increase at least five times the due to the bulging fairing pane 102. When in the deflected state, the fairing pane 102 may fill most of the depression 84 along the exterior of the fuselage 18. For example, the volume of the gap 110 may represent at least 50% of a volume of the depression 84. Optionally, the volume of the gap 110 may represent at least 75% of the volume of the depression 84. The fairing pane 102 filling the depression 84 reduces drag, which increases the travel efficiency of the aircraft 10.

Although the pressure differential across the window at cruise conditions may be greater for aircraft than ground, rail, and water-based forms of vehicles, the fairing pane 102 may provide similar function on such other types of vehicles. For example, a pressure differential may exist across the fairing pane 102 based on a fast speed of the ground, rail, or water-based vehicle, such that the fairing pane 102 bulges outward to reduce drag.

Figure 8:
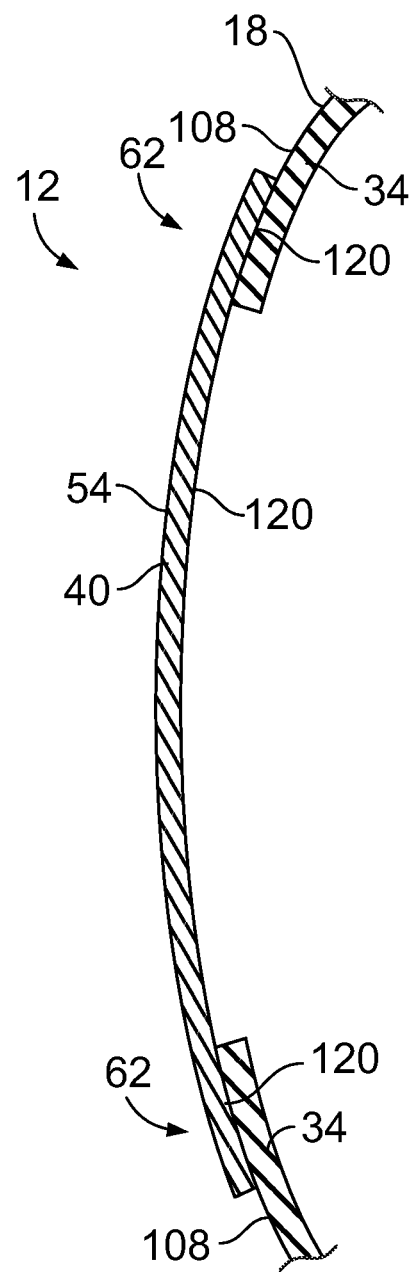
FIG. 8 is a cross-sectional view of the window assembly according to another embodiment.

FIG. 8 is a cross-sectional view of the window assembly 12 according to another embodiment. In FIG. 8, the perimeter portion 62 of the window pane 40 is secured to the body panel 34 along the outer surface 108 of the body panel 34. The outer surface 108 faces away from the internal cabin 19 of the fuselage 18. For example, an inner surface 120 of the window pane 40 may be affixed to the outer surface 108 of the body panel 34. The window pane 40 may be bonded to the body panel 34 via an adhesive, coupled via the fasteners 42, and/or the like.

The window pane 40 may be sufficiently thin, such as less than 0.5 inches thick, to not cause noticeable drag along the exterior of the fuselage 18 during flight. Furthermore, the window pane 40 is sufficiently strong and rigid, due to the laminated stack of the tempered glass sheets, to avoid bulging outward (and causing drag) when exposed to a pressure differential during flight. Optionally, the window pane 40 may be the only panel of the window assembly 12. For example, the inner surface 120 of the window pane 40 may be exposed to the internal cabin 19, and the outer surface 54 of the window pane 40 may be exposed to the ambient, external environment outside of the fuselage 18. The window assembly 12 in FIG. 8 does not include the fairing pane 102 shown in FIGS. 5 through 7. As shown in FIG. 8, the window assembly 12 may have significantly fewer components than conventional window assemblies.

Figure 9:
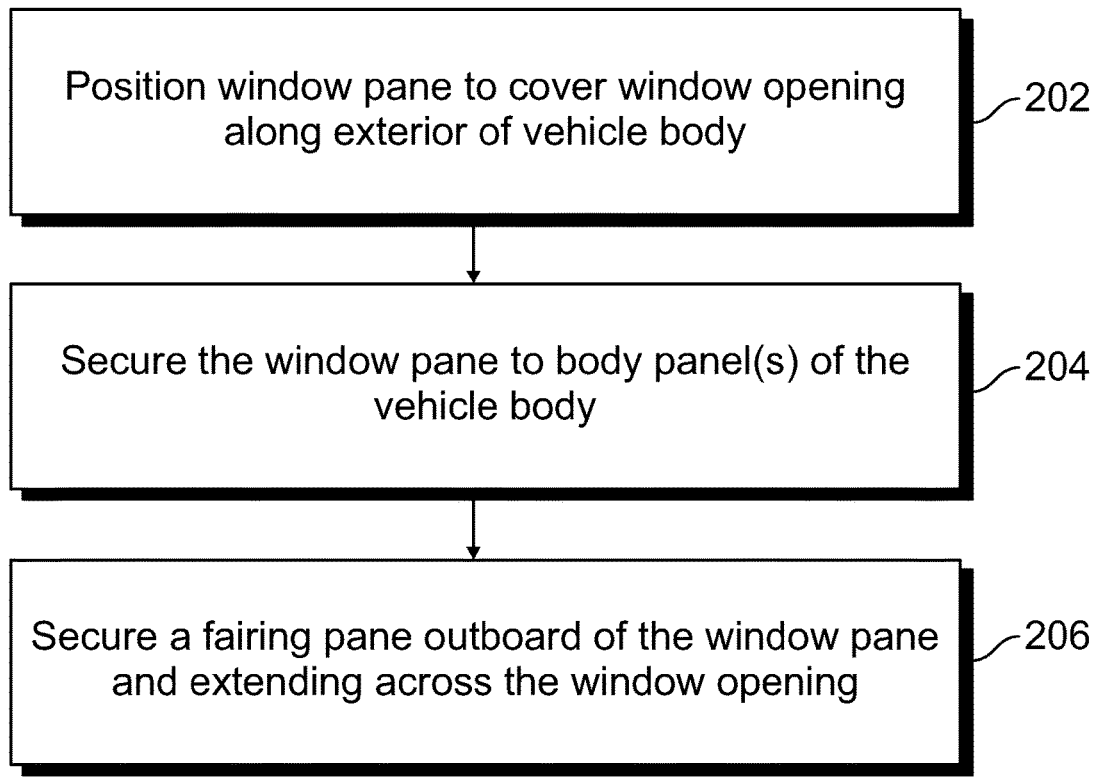
FIG. 9 is a flow chart of a method for assembling a window assembly, according to an embodiment of the present disclosure.

FIG. 9 is a flow chart 200 of a method for assembling a window assembly in a vehicle according to an embodiment. The method may include more steps, fewer steps, and/or different steps than shown in the flow chart 200. Furthermore, the steps of the method may be performed in a different order than the chronological order presented in FIG. 9 unless specified. The method includes, at step 202, positioning a window pane 40 to cover a window opening 30 along an exterior of a vehicle body 18. The vehicle body 18 may be a fuselage 18 of an aircraft. Alternatively, the vehicle body 18 may be a component of a ground-based vehicle, a rail-based vehicle, or a water-based vehicle. In an embodiment, the window pane 40 is a laminate stack 43 of multiple tempered glass sheets 44 bonded together. The window pane 40 is positioned such that a perimeter portion 62 of the window pane 62 is disposed outside of the window opening 30 and overlaps a portion of at least one body panel 34 of the vehicle body 18.

At step 204, the window pane 40 is secured to the at least one body panel 34 of the vehicle body 18. For example, the perimeter portion 62 of the window pane 40 is affixed to the at least one body panel 34 via a lap joint. The lap joint may be formed by bonding the window pane 40 to the at least one body panel 34 using an adhesive. Alternatively, or in addition, the lap joint may be formed by installing at least one fastener 42 through respective holes in the window pane 40 and the at least one body panel 34.

Optionally, the window pane 40 is secured along an inner surface 72 of the at least one body panel 34. The method may further include, at step 206, securing a fairing pane 102 outboard of the window pane 40 and extending across the window opening 30. The fairing pane 102 is secured to the window pane 40 and/or the at least one body panel 34. The fairing pane 102 is secured such that a medial portion 104 of the fairing pane 102 is separated from the window pane 40 by a gap 110 that contains a gas. The medial portion 104 may bulge outward away from the window pane 40, increasing the size (e.g., volume) of the gap 110, based on a pressure differential across the fairing pane 102. In an alternative embodiment, the window pane 40 is secured along an outer surface 108 of the body panel 34, and may lack the fairing pane 102.

As described herein, the window assembly is strong, rigid, and lightweight. The window assembly is suitable for use on aircraft and other types of vehicles. The window pane of the window assembly may structurally support the vehicle body by absorbing forces, such as internal pressure, hoop tension and shear force. The window assembly described herein also avoids the use of a discrete frame assembly, further reducing weight, part count, and complexity. The use of the fairing pane may reduce drag, enabling more efficient vehicle travel.

Clause 1: A vehicle window assembly comprising:
  at least one body panel that defines a window opening along an exterior surface of a vehicle body, the vehicle body defining an internal cabin; and
  a window pane secured to the at least one body panel and positioned to cover the window opening, the window pane being a laminate stack of multiple tempered glass sheets bonded together.

Clause 2: The vehicle window assembly of Clause 1, wherein the window pane includes a perimeter portion positioned outside of the window opening and overlapping a portion of the at least one body panel, wherein the window pane is secured to the at least one body panel by installing one or more fasteners through the perimeter portion of the window pane into the portion of the at least one body panel.

Clause 3. The vehicle window assembly of Clause 2, wherein the one or more fasteners include a protective coating along surfaces of the one or more fasteners that contact the window pane.

Clause 4. The vehicle window assembly of any of Clauses 1-3, wherein the window pane includes a perimeter portion positioned outside of the window opening and overlapping a portion of the at least one body panel, wherein the window pane is secured to the at least one body panel by bonding a surface of the perimeter portion of the window pane to a surface of the at least one body panel via an adhesive.

Clause 5. The vehicle window assembly of any of Clauses 1-4, wherein each of the glass sheets in the laminate stack has a thickness no greater than 0.05 inches.

Clause 6. The vehicle window assembly of any of Clauses 1-5, wherein the window pane has a thickness no greater than 0.75 inches.

Clause 7. The vehicle window assembly of any of Clauses 1-6, wherein the window pane further comprises a transparent ceramic sheet at an end of the laminate stack, the transparent ceramic sheet bonded to one of the glass sheets in the laminate stack.

Clause 8. The vehicle window assembly of any of Clauses 1-7, wherein the window pane is secured to the at least one body panel along an inner surface the at least one body panel, the inner surface facing towards the internal cabin.

Clause 9. The vehicle window assembly of Clause 8, wherein the at least one body panel and an outer surface of the window pane define a depression along the exterior surface of the vehicle body at the window opening, and the vehicle window assembly further comprises:
  a fairing pane positioned outboard of the window pane and extending across the depression, wherein a medial portion of the fairing pane is separated from the window pane by a gap that contains a gas, the medial portion configured to bulge outward away from the window pane, increasing a size of the gap, based on a pressure differential across the fairing pane.

Clause 10. The vehicle window assembly of Clause 9, wherein the fairing pane includes a perimeter portion that surrounds the medial portion and is secured to at least one of the window pane or the at least one body panel.

Clause 11. The vehicle window assembly of Clause 10, wherein the perimeter portion of the fairing pane is positioned outboard of the at least one body panel, such that the at least one body panel is disposed between the perimeter portion of the fairing pane and the window pane.

Clause 12. The vehicle window assembly of Clause 10, wherein the fairing pane includes a sloped transition segment disposed between the medial portion and the perimeter portion of the fairing pane.

Clause 13. The vehicle window assembly of Clause 9, wherein the medial portion of the fairing pane is designed to bulge, based on the pressure differential experienced by the fairing pane while the vehicle body travels at a cruising speed and a cruising altitude, such that a volume of the gap fills at least 50% of a volume of the depression along the exterior surface of the vehicle body at the window opening.

Clause 14. The vehicle window assembly of any of Clauses 1-13, wherein the window pane is secured to the at least one body panel along an outer surface of the at least one body panel, the outer surface facing away from the internal cabin.

Clause 15. The vehicle window assembly of Clause 14, wherein an inner surface of the window pane is exposed to the internal cabin and an outer surface of the window pane is exposed to an ambient environment outside of the vehicle body.

Clause 16. A method for assembling a vehicle window, the method comprising:
  securing a window pane to at least one body panel of a vehicle body, the window pane positioned to cover a window opening along an exterior surface of the vehicle body, wherein the window pane is a laminate stack of multiple tempered glass sheets bonded together.

Clause 17. The method of Clause 16, wherein securing the window pane to the at least one body panel comprises positioning a perimeter portion of the window pane to overlap a portion of the at least one body panel, and installing one or more fasteners through the perimeter portion of the window pane into the portion of the at least one body panel.

Clause 18. The method of Clause 16 or Clause 17, wherein securing the window pane to the at least one body panel comprises positioning a perimeter portion of the window pane to overlap the at least one body panel, and bonding a surface of the perimeter portion of the window pane to a surface of the at least one body panel via an adhesive.

Clause 19. The method of any of Clauses 16-18, wherein securing the window pane to the at least one body panel comprises securing the window pane along an inner surface of the at least one body panel, and the method further comprises:
  securing a fairing pane to at least one of the window pane or the at least one body panel, the fairing pane positioned outboard of the window pane and extending across the window opening, wherein the fairing pane is secured such that a medial portion of the fairing pane is separated from the window pane by a gap that contains a gas, the medial portion configured to bulge outward away from the window pane, increasing a size of the gap, based on a pressure differential across the fairing pane.

Clause 20. An aircraft comprising:
  a fuselage defining an internal cabin, the fuselage including at least one panel that defines a window opening along an exterior surface of the fuselage;
  a window pane secured to the at least one body panel and positioned to cover the window opening, the window pane being a laminate stack of multiple tempered glass sheets bonded together; and
  a fairing pane secured to at least one of the window pane or the at least one body panel, the fairing pane positioned outboard of the window pane and extending across the window opening, wherein a medial portion of the fairing pane is separated from the window pane by a gap that contains a gas, the medial portion configured to bulge outward away from the window pane, increasing a size of the gap, based on a pressure differential experienced by the fairing pane when the aircraft is traveling at a cruising speed and a cruising altitude.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, the term "outboard" means a position that is farther away from a center (e.g., medial) longitudinal plane of the internal cabin of the vehicle body or fuselage, relative to another component. The center longitudinal plane is halfway between opposing first and second sides of the internal cabin. The term "inboard" means a position that is closer to the center longitudinal plane relative to another component.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

As used herein, approximating value modifiers such as "about," "substantially," "generally," and "approximately" inserted before a numerical value indicate that the value can represent other values within a designated threshold range above and/or below the specified value without resulting in a change in the basic function to which it may be related. Accordingly, a value modified by a term or terms, such as "about," "substantially," "generally," and "approximately," may be not to be limited to the precise value specified. The approximating terms may indicate inclusion of values within a designated threshold margin of the precise value. The threshold margin may be plus/minus 3% of the precise value, plus/minus 5% of the precise value, plus/minus 10% of the precise value, or the like. Two items or axes that are generally parallel can be angled within 3 degrees of each other in one example, within 5 degrees of each other in a second example, and within 10 degrees of each other in a third example.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:
1. A vehicle window assembly comprising:
  a vehicle body that defines an internal cabin, the vehicle body including at least one body panel that defines a window opening in the vehicle body and forms an exterior surface of the vehicle body, the exterior surface exposed to an ambient environment outside of the vehicle body;

a window pane secured to the vehicle body and positioned to cover the window opening, wherein the window pane is a laminate stack of multiple tempered glass sheets bonded together, the window pane secured to the vehicle body via a first lap joint between a perimeter portion of the window pane and an inner surface of the at least one body panel, the inner surface facing towards the internal cabin, wherein the at least one body panel and an outer surface of the window pane define a depression along the exterior surface of the vehicle body at the window opening; and a fairing pane positioned outboard of the window pane and extending across the depression, wherein a medial portion of the fairing pane is separated from the window pane by a gap that contains a gas, wherein a perimeter portion of the fairing pane is positioned outboard of the exterior surface of the vehicle body and is secured to the at least one body panel via a second lap joint between the perimeter portion of the fairing pane and the exterior surface.

2. The vehicle window assembly of claim 1, wherein the vehicle body is a fuselage of an aircraft, and the medial portion is configured to bulge outward away from the window pane during a flight of the aircraft, increasing a size of the gap, based on a pressure differential across the fairing pane.

3. The vehicle window assembly of claim 1, wherein the at least one body panel is stacked between the perimeter portion of the fairing pane and the perimeter portion of the window pane.

4. The vehicle window assembly of claim 3, wherein one or more fasteners extend continuously through the perimeter portion of the fairing pane, the at least one body panel, and the perimeter portion of the window pane.

5. The vehicle window assembly of claim 4, wherein the one or more fasteners include a protective coating along surfaces of the one or more fasteners that contact the window pane.

6. The vehicle window assembly of claim 1, wherein the perimeter portion of the fairing pane is bonded to the exterior surface of the vehicle body at the second lap joint via an adhesive.

7. The vehicle window assembly of claim 1, wherein the vehicle body is a fuselage of an aircraft, and the at least one body panel is a skin of the fuselage.

8. The vehicle window assembly of claim 1, wherein an outer surface of the perimeter portion of the window pane is bonded to the inner surface of the at least one body panel at the first lap joint via an adhesive.

9. The vehicle window assembly of claim 1, wherein the window pane has a thickness no greater than 0.75 inches.

10. The vehicle window assembly of claim 1, wherein the window pane is secured to the at least one body panel via the first lap joint without an intervening frame assembly.

11. The vehicle window assembly of claim 1, wherein each of the tempered glass sheets in the laminate stack has a thickness no greater than 0.05 inches.

12. The vehicle window assembly of claim 1, wherein the window pane further comprises a transparent ceramic sheet at an end of the laminate stack, the transparent ceramic sheet bonded to one of the tempered glass sheets in the laminate stack.

13. The vehicle window assembly of claim 1, wherein the inner surface of the window pane is exposed to the internal cabin and the outer surface of the window pane is exposed to the ambient environment outside of the vehicle body.

14. The vehicle window assembly of claim 1, wherein the fairing pane comprises a thermoplastic material.

15. The vehicle window assembly of claim 1, wherein the fairing pane includes a sloped transition segment located between the medial portion of the fairing pane and the perimeter portion of the fairing pane so that the medial portion of the fairing pane is disposed closer to the window pane than a proximity of the perimeter portion of the fairing pane to the window pane.

* * * * *